(No Model.)
M. A. RAFTER.
FABRIC TURFING IMPLEMENT.
No. 337,196. Patented Mar. 2, 1886.
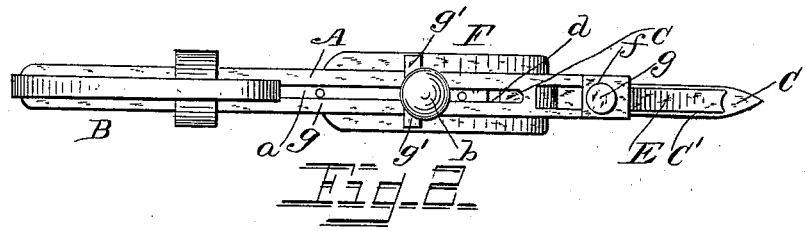
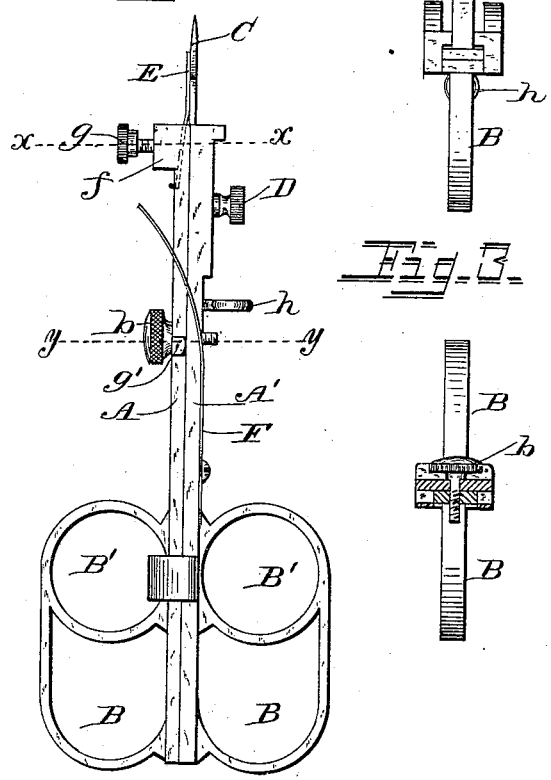
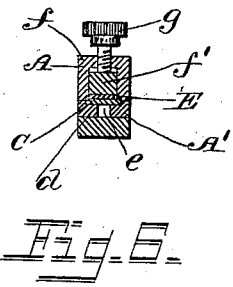
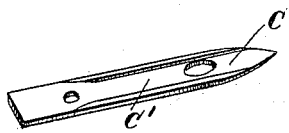
Witnesses
H. J. Schneider
Thos. McGill
Inventor
Madison A. Rafter
By Myers & Co.
Attorneys

UNITED STATES PATENT OFFICE.

MADISON A. RAFTER, OF LOCKPORT, NEW YORK, ASSIGNOR TO THE RAFTER EMBROIDERY MACHINE COMPANY, OF SAME PLACE.

FABRIC-TURFING IMPLEMENT.

SPECIFICATION forming part of Letters Patent No. 337,196, dated March 2, 1886.

Application filed December 19, 1884. Serial No. 150,772. (No model.)

*To all whom it may concern:*

Be it known that I, MADISON A. RAFTER, a citizen of the United States of America, residing at Lockport, in the county of Niagara and State of New York, have invented certain new and useful Improvements in Fabric-Turfing Implements, of which the following is a specification, reference being had therein to the accompanying drawings.

This invention pertains to improvements in fabric-turfing implements, having specially for its object to produce stitches of uniform length, to facilitate the embroidering or turfing operation, and to lessen the labor of the operator; and to these ends the invention consists, principally, in providing the "stick" or holding-bar which supplements the action of the needle with a cam or spring action; and it consists, further, of the combination of parts and their construction, substantially as hereinafter fully set forth and claimed.

In the accompanying drawings, Figure 1 is a top plan view of a turfing implement embodying my invention. Fig. 2 is a rear elevation thereof. Fig. 3 is a vertical section of the same on the line $y\,y$, Fig. 4. Fig. 4 is a side elevation. Fig. 5 is a sectional detail view on the line $x\,x$, Fig. 4; and Fig. 6 is a detail view of the needle.

In the embodiment of my invention I employ, as usual, two parallel sliding handles, A A', one of which is slotted, as at $a$, to receive a holding-screw, $b$, entering the other handle, and which screw, with the aid of cleats or side flanges formed upon one handle and lapping the other handle, connects said handles and adapts one handle to slide upon the other. The screw $b$ also serves to limit the downward stroke of the handle A' and the upward stroke of the handle A. The handles A A' are provided at or near their upper ends with finger-loops B, the main loop of each handle having supplementary or inner lower end loops, B', for greater convenience in manipulating the machine. In the inner side of the handle A' is a groove or recess, $d$, to receive the needle C, which is held therein by a holding and adjusting screw, D, passed through a vertical slot, $e$, in the handle A', to permit of the vertical adjustment of the needle to regulate the depth of stitch, accommodating the machine to the grade of work (coarse or fine) to be performed. The inner side of the needle C may be provided with a recess or groove, C', which is concaved in its transverse section and receives and guides in its movement the loop-holder E, having a lower concaved edge and held in a socket, $f$, in the lower end of the handle A by a flat block, $f'$, filling the unoccupied portion of the socket, and by a holding or adjusting screw, $g$, said socket inclining toward the needle. The adjustment of the loop-holder to secure its coincidence with the needle is also effected by the screw $g$, to enable it to coact with the needle—*i. e.*, to immediately supplement the action of the latter and hold the stitch while the needle is making another in performing the embroidering operation.

$h$ is an eye or guide, secured in one side of the handle A', through which guide the thread is first passed, it being next carried through the eye of the needle.

The principal or main feature of this invention, which will now be described, consists in providing the handle A with automatic movement or action, whereby the stitches are made of uniform length, as will more fully appear presently. To effect said movement of the said handle A, I provide the handle A' with a forked spring-plate, F, with its shank screwed or otherwise fastened to the latter handle, while its arms or tines are curved and caused to project alongside of and beyond the side edges of the two handles, the concavity of their curvature being presented upward. I next form the bar or lever A, at its side edges, with studs or projections $g'$, so disposed with relation to the arms or prongs of the spring F as that upon the upward stroke or movement of the handle A' (at which moment the handle A is holding the stitch just made by the handle A') the recoil action of the spring-arms, which, by their contact with the studs $g'$ of the handle A, have been distended or put under tension, will (the grasp of the hand being released from said bar A) automatically elevate or lift said bar or handle A from the stitch just made in readiness to secure the following stitch being made by the handle A' with its needle, and so on during the entire embroidering or turfing operation.

From the foregoing it will be observed that there will not be the slightest possible irregularity in the supplementing action of the handle A and its loop-holder, the effect of which, it is apparent, will be formation of stitches of uniform length, while the manipulation of the machine can be effected, mainly, by the action of the single hand exerted upon the handle A' without embarrassing it, as might occur by the action of the other hand in lifting the handle A, the same having only a single independent movement — an upward one — caused by the recoil action of the spring-arms in contact with the studs $g'$ of said handle A. This feature of my invention, it is obvious, also facilitates the embroidering operation, while it is capable of manipulation in performing good work in the hands of an unskilled person as in the hands of an experienced person.

Having thus fully described my invention, what I claim, and desire to secure by Letters Patent, is—

1. In a fabric-turfing implement having the handle A', carrying a needle, and the handle A, having in its lower end a socket provided with an adjusting and holding screw, in combination with the loop-holder fitted with a block in said socket, substantially as shown, and for the purpose described.

2. In a fabric-turfing implement, the handle A', carrying a needle, and having a groove, $d$, a holding and adjusting screw, D, a guide, $h$, and a spring with arms, in combination with the handle A, having the loop-holder and studs at its side edges, substantially as shown, and for the purpose described.

3. In a fabric-turfing implement, the handle A', having the spring with arms extending at and beyond the side edges of said handle, in combination with the handle A, having studs at its side edges and acting upon said spring-arms, substantially as shown, and for the purpose described.

4. In a fabric-turfing implement, the combination, with the handle A', having finger-loops, cleats, a screw, a spring having arms, a guide, a groove, an adjusting-screw, and carrying a needle, of the handle A, also having finger-loops, a slot, $a$, studs, a loop-holder, and a socket having a flat block and a holding or adjusting screw, all arranged substantially as shown and described.

In testimony whereof I affix my signature in presence of two witnesses.

MADISON A. RAFTER.

Witnesses:
H. H. FLAGLER,
M. C. RICHARDSON.